United States Patent
Govindan et al.

(10) Patent No.: US 11,689,449 B2
(45) Date of Patent: Jun. 27, 2023

(54) NODE PROTECTION FOR A SOFTWARE DEFINED REPLICATOR

(71) Applicant: Cisco Technology, Inc., San Jose, CA (US)

(72) Inventors: Vengada Prasad Govindan, Chennai (IN); Aswin Kuppusami, Chennai (IN); Manikandan Panchanathan, Chennai (IN); Ravi Kiran Chintallapudi, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 106 days.

(21) Appl. No.: 17/307,725

(22) Filed: May 4, 2021

(65) Prior Publication Data
US 2022/0360522 A1 Nov. 10, 2022

(51) Int. Cl.
*H04L 45/28* (2022.01)
*H04L 41/0668* (2022.01)
*H04L 12/18* (2006.01)
*H04L 45/16* (2022.01)

(52) U.S. Cl.
CPC .............. *H04L 45/28* (2013.01); *H04L 12/18* (2013.01); *H04L 41/0668* (2013.01); *H04L 45/16* (2013.01)

(58) Field of Classification Search
None
See application file for complete search history.

(56) References Cited

U.S. PATENT DOCUMENTS

| 7,269,132 | B1* | 9/2007 | Casey ................. H04L 41/0663 370/467 |
| 9,319,347 | B1 | 4/2016 | Sindhu et al. |
| 9,998,291 | B1 | 6/2018 | Khan et al. |
| 2013/0329605 | A1 | 12/2013 | Nakil et al. |
| 2015/0207640 | A1* | 7/2015 | Teng ....................... H04L 12/18 370/390 |
| 2015/0350077 | A1* | 12/2015 | Durrani ................. H04L 41/022 709/225 |
| 2016/0013949 | A1 | 1/2016 | Johri et al. |
| 2017/0078188 | A1 | 3/2017 | Allan |
| 2017/0085488 | A1* | 3/2017 | Bhattacharya ........ H04L 41/122 |
| 2017/0353383 | A1* | 12/2017 | Hughes ............... H04L 41/0893 |
| 2020/0044965 | A1* | 2/2020 | Raj ....................... H04L 45/245 |
| 2020/0177401 | A1 | 6/2020 | Kebler et al. |
| 2020/0177438 | A1* | 6/2020 | Nandy ................ H04L 41/0836 |
| 2022/0321451 | A1* | 10/2022 | Brissette ............. H04L 41/0686 |

* cited by examiner

*Primary Examiner* — Kenny S Lin
(74) *Attorney, Agent, or Firm* — Baker Botts L.L.P.

(57) ABSTRACT

According to certain embodiments, a system comprises one or more processors and one or more computer-readable non-transitory storage media comprising instructions that, when executed by the one or more processors, cause one or more components of the system to perform operations. The operations comprise selecting a primary node to replicate multicast traffic and forward the multicast traffic to a plurality of receivers, selecting one or more secondary nodes to provide node-level redundancy for the primary node, and providing the one or more secondary nodes with synchronization information that enables the one or more secondary nodes to replicate the multicast traffic and forward the multicast traffic to the plurality of receivers in response to the primary node becoming unavailable. Selecting the primary node is based in software.

20 Claims, 4 Drawing Sheets

NODE PROTECTION FOR A SOFTWARE DEFINED REPLICATOR

TECHNICAL FIELD

The present disclosure generally relates to node protection in a network, and more specifically to node protection for a software defined replicator.

BACKGROUND

Multicast techniques allow for sending data to a group of interested receivers. Multicast techniques may make efficient use of network infrastructure, for example, by requiring the source to send a packet only once, even if the packet needs to be delivered to a large number of receivers. Nodes in the network, such as switches and routers, may replicate the packet so that the packet reaches each interested receiver.

DESCRIPTION OF EXAMPLE EMBODIMENTS

Overview

Figure 1:
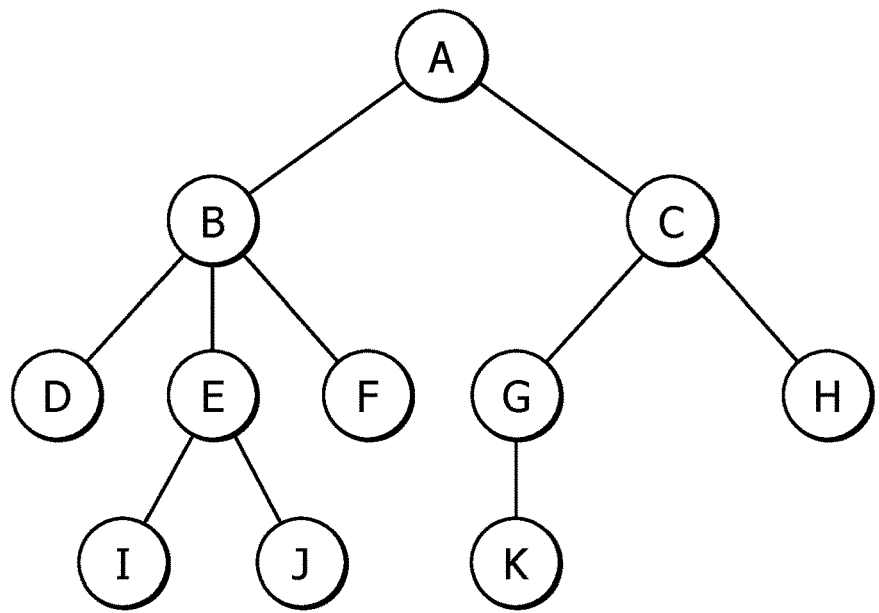
FIG. 1 illustrates an example of a system that defines replicators based on network topology.

According to an embodiment, a system comprises one or more processors and one or more computer-readable non-transitory storage media comprising instructions that, when executed by the one or more processors, cause one or more components of the system to perform operations. The operations comprise selecting a primary node to replicate multicast traffic and forward the multicast traffic to a plurality of receivers, selecting one or more secondary nodes to provide node-level redundancy for the primary node, and providing the one or more secondary nodes with synchronization information that enables the one or more secondary nodes to replicate the multicast traffic and forward the multicast traffic to the plurality of receivers in response to the primary node becoming unavailable. Selecting the primary node is based in software.

According to another embodiment, a method comprises selecting a primary node to replicate multicast traffic and forward the multicast traffic to a plurality of receivers, selecting one or more secondary nodes to provide node-level redundancy for the primary node, and providing the one or more secondary nodes with synchronization information that enables the one or more secondary nodes to replicate the multicast traffic and forward the multicast traffic to the plurality of receivers in response to the primary node becoming unavailable. Selecting the primary node is based in software.

According to yet another embodiment, one or more computer-readable non-transitory storage media may embody instructions that, when executed by a processor, cause the performance of operations including selecting a primary node to replicate multicast traffic and forward the multicast traffic to a plurality of receivers, selecting one or more secondary nodes to provide node-level redundancy for the primary node, and providing the one or more secondary nodes with synchronization information that enables the one or more secondary nodes to replicate the multicast traffic and forward the multicast traffic to the plurality of receivers in response to the primary node becoming unavailable. Selecting the primary node is based in software.

Technical advantages of certain embodiments of this disclosure may include one or more of the following. Certain embodiments provide node-level redundancy for a software defined replicator. In the event that the replicator goes out-of-service or is taken out-of-service, its receivers continue to receive traffic from another replicator that provides redundancy for the original replicator. Certain embodiments use a controller in the control plane to manage redundancy and to synchronize the replicator that provides redundancy. Using the controller to manage redundancy adds flexibility and facilitates strategic selection of the replicators. For example, replicators can be selected to provide load-sharing. Additionally, using the controller to manage redundancy may allow for efficient use of resources of a replicator. For example, when the controller handles synchronizing the redundant replicator, resources of the original replicator that otherwise would have been needed to maintain the synchronization can be used for other purposes. Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In a Software Defined-Wide Area Network (SD-WAN) multicast design, a replicator (also referred to as a replication node) can be used to build a multicast tree. For efficient use of network bandwidth, strategic edge devices (e.g., edge routers) can be deployed and used as replicators throughout the overlay network. Replicators mitigate the requirement for an ingress router to replicate a multicast stream once for each receiver. For this reason, replicators are more powerful than ingress routers. However, when a replicator node goes out-of-service or is taken out-of-service, a large number of leaf nodes (receivers) would stop receiving traffic. This effect gets compounded when replicators are hierarchically designed. Certain embodiments of the present disclosure provide a solution to this problem. For example, the solution proposes providing node-level redundancy for a multicast replicator in an SD-WAN multicast overlay.

Figure 2:
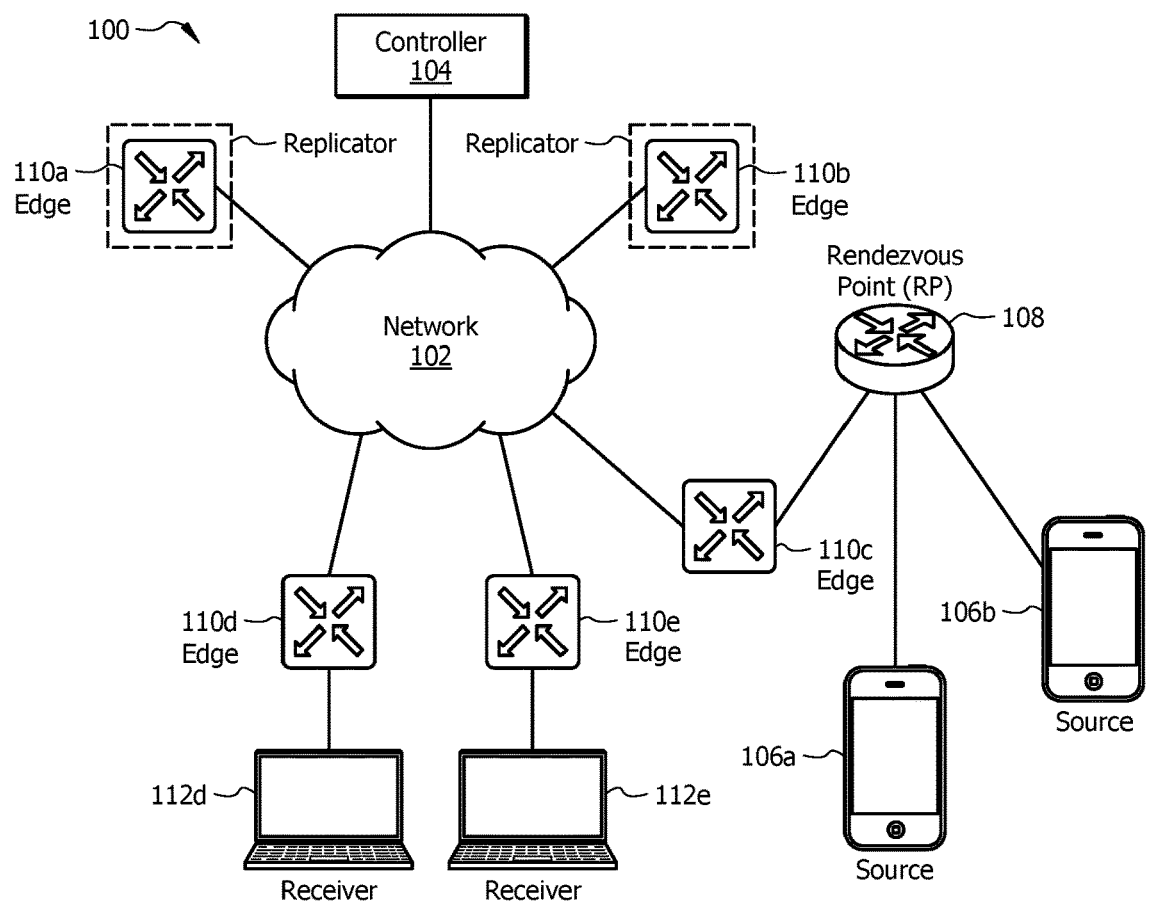
FIG. 2 illustrates an example of a system that defines replicators in software, in accordance with certain embodiments.

FIG. 1 provides an example of a traditional network that uses replication and FIG. 2 illustrates an example of an SD-WAN network that uses replication. As further explained below, the SD-WAN provides certain advantages compared to a traditional network. The following overview of replication in the traditional network provides context for understanding advantages of the SD-WAN. The traditional network illustrated in FIG. 1 comprises a plurality of nodes A-K. In the example of FIG. 1, the nodes are arranged hierarchically with node A at the top; nodes B and C beneath node A; nodes D, E, and F beneath node B; nodes G and H beneath node C; nodes I and J beneath node E; and node K beneath node G.

In the traditional network, the point of replication depends on the physical network topology. That is, the replication point is selected based on the shortest path (e.g., the shortest path in terms of topology distances based on, for example, link weights and other routing parameters, geographical distances, etc.). Specifically, the point of replication occurs where joins from different receivers converge. As an example, in FIG. 1, suppose each of nodes D, I, and J join a multicast stream. Based on the network topology, the joins from nodes I and J converge at node E, so node E would be used as a replication point. Similarly, the joins from nodes D and E converge at node B, so node B would also be used as a replication point. Node A sends a multicast stream to node B; node B creates two copies and sends one copy to node D and one copy to node E; node E makes two copies and sends one copy to node I and one copy to node J. In this manner, replication is permeated throughout the network and many copies of the multicast traffic may need to be created. For example, depending on how many nodes join the multicast and where the joins converge, the number of copies in a typical network may be on the order of many thousands. Because the point of replication depends on the physical network topology, the only way to change the replication point is to wire the network differently.

FIG. 2 illustrates an example of an SD-WAN 100. SD-WAN 100 introduces a new method of selecting a point of replication. Instead of selecting the point of replication based on hardware/physical network topology, SD-WAN 100 uses software to select the point of replication. Using software to select the point of replication increases flexibility. The tradeoff is that the software selection may be less efficient than selection based on hardware/network topology because the replication point may be far from the node that is to receive the multicast.

As illustrated in FIG. 2, SD-WAN 100 may comprise network 102, controller 104, one or more sources 106 (such as source 106a and source 106b), a rendezvous point (RP) 108, a plurality of edge devices 110 (such as edge devices 110a, 110b, 110c, 110d, and 110e), and a plurality of receivers 112 (such as receiver 112d and receiver 112e). In general, network 102 facilitates communication among components of SD-WAN 100. In certain embodiments, network 102 comprises an underlay network that supports a virtual overlay network. An underlay network may include, for example, all or a portion of: the Internet, one or more Internet Protocol (IP) networks (such as one or more IP Security, IPsec, networks), one or more Multiprotocol Label Switching (MPLS) networks, one or more cellular network(s), and/or other suitable networks. Further examples of networks are described below with respect to FIG. 5 (e.g., describing a communication interface 510 that may communicate with various examples of networks). In certain embodiments, the virtual overlay network may comprise data plane connections/tunnels that carry traffic between components of SD-WAN 100.

A control plane of SD-WAN 100 may comprise controller 104. In certain embodiments, controller 104 provides control-related functionality, such as maintaining a centralized routing table and routing policies to program the forwarding behavior of the data plane; maintaining a direct control plane connection to each edge device 110; provisioning, maintaining, and/or securing the overlay network; and/or other suitable controls. In addition, controller 104 may define and synchronize replicators for multicast streams, as further explained below. An example of controller 104 may include Cisco's vSmart.

In certain embodiments, a source 106, such as source 106a or 106b, may originate a multicast stream. As one example, a source 106 could be a video camera that provides video data to be multicast to a plurality of receivers 112. RP 108 acts as the meeting place for sources 106 and receivers 112 of multicast data. For example, sources 106 send their traffic to RP 108 so that the traffic can be forwarded to receivers 112 via edge devices 110. In general, edge devices 110 may connect receivers 112 to other portions of SD-WAN 100 via network 102. As an example, an edge device 110 located at an organization's branch, regional, or central office site may allow connect receivers 112 to other portions of SD-WAN 100 via network 102. Examples of edge devices 110 may include Cisco's vEdge and/or cEdge routers. Examples of receivers 112 may include user devices, such as a desktop computer system, a laptop or notebook computer system, an interactive kiosk, a mobile telephone, a personal digital assistant (PDA), a tablet computer system, an augmented/virtual reality device, etc. Additional examples of receivers 112 may include servers, mainframes, data centers, cloud platforms, or any other computer system capable of receiving a multicast stream.

In certain embodiments, controller 104 defines at least one edge device 110 as a replicator for multicast traffic. FIG. 2 illustrates an example where controller 104 defines edge device 110a as a primary replicator and edge device 110b as a secondary replicator. Controller 104 selects replication points strategically. There can be multiple replicators per stream, and replicators can be used to provide load balancing/load sharing in terms of space and/or group. As an example, controller 104 could define one replicator for the East coast and another replicator for the West coast. As another example, controller 104 could define one replicator for a first set of channels (e.g., channels 1-500) and another replicator for another set of channels (e.g., channels 501-1000).

For a given group, if the replicator goes down, a certain number of receivers 112 will be affected. To address this problem, controller 104 can be used to facilitate redundancy of replicators. For example, controller 104 participates in the control plane and is responsible for propagating the routes. Controller can configure a full mesh (every edge device 110 talks to every other edge device 110), or controller 104 can have all the edge devices 110 send control plane communication to controller 104 (and controller 104 propagates the communication).

Because controller 104 knows all the data synchronization (or "sync") from one edge device 110 to another, controller 104 can ensure that a standby edge device 110 is properly synced. The sync begins at the first sync (e.g., G sync, 0) and incrementally syncs at each point. Controller 104 then maintains the sync, for example, by selecting specific route types needed to construct and update the sync. In certain embodiments, controller 104 builds the standby replicator without the active replicator being aware. For example, in certain embodiments, controller 104 proxies the active replicator to ensure that the standby replicator knows as much as the active replicator. Because the sync happens through controller 104, the active replicator does not need to provide the standby replicator with its route information, construct sync messages, or otherwise keep up the sync.

In certain embodiments, controller 104 defines more than one standby replicator. The number of standby replicators can be defined based on policy. In certain embodiments, controller configures an active-active mode where one or more active replicators can be synced to provide redundancy for another active replicator. Controller 104 can build the one or more standby replicators based on information that controller 104 has previously gained from the active replicator, without requiring much involvement from the active replicator when the time comes to build the standby replicator. Controller 104 can construct any kind of network any way that it wants. Examples include one active replicator and one standby replicator; ten load-balanced active replicators; etc. In certain embodiments, the standby replicator provides hot-standby redundancy. For example, the hot-standby replicator may run simultaneously with the active replicator. Upon failure of the active replicator, the hot standby replicator immediately takes over, replacing the active replicator. In certain embodiments, controller 104 supports different types of redundancy so that redundancy can be extended and provided with flexibility depending on the needs of a particular network.

As described above, a replicator receives multicast data and makes a copy of the multicast data for a receiver. The replicator can replicate multicast traffic that is rooted anywhere (e.g., either * root or S root). The replication or load-sharing for a (*, G) stream versus an (S, G) stream could be done differently. For example, a policy may instruct replicator to apply rule X for a (*, G) stream and to apply rule Y for an (S, G) stream. In both cases, the G represents multiple receivers that want to receive the multicast stream. The S indicates that the multicast stream is to be received from a particular source, such as an IP address of a particular video camera. The * is a wildcard indicating that the multicast stream can be received from any source.

An advantage of the proposed solution involves offering node-level protection of a replicator. Typically, when a replicator fails, a large number of receivers 112 (e.g., Last Hop Routers or "LHRs") stop receiving multicast traffic. By contrast, the proposed solution protects the replicator by having one or more backup replicators (e.g., as a hot-standby) so that the LHRs continue to receive multicast traffic even when the original replicator fails. For example, considering the SD-WAN 100 illustrated in FIG. 1, edge devices 110*d* and 110*e* associated with receiver 112*d* and 112*e*, respectively, for a particular multicast stream (such as a (*, G) or an (S, G) stream) send a join interest to a replicator hosted in edge device 110*a* (primary replicator). The overlay may be arranged similarly to a mobile virtual private network (MVPN), with edge devices 110 all being provider edges (PEs) running overlay management protocol (OMP) with replicators doing ingress-replication to egress PEs. The primary replicator (edge device 110*a*) then joins the shared tree rooted at RP 108 (if the join received is a (*, G)) or at the source specific tree rooted at the First Hop Router (FHR) (if the join received is an (S, G)). Certain embodiments encode this information as an MVPN Border Gateway Protocol (BGP) route-type 6/7 or a similar route-type in Overlay Management Protocol (OMP) or other protocol. This join information should be synced to the backup replicator, such as edge device 110*b*, through controller 104. This opens up possibilities for different redundancy mechanisms.

In certain embodiments, one or more BFD sessions can be used to detect a node failure of an edge device 110. A node failure detected on the active replicator (e.g., primary replicator/edge device 110*a*) triggers a switchover to the backup replicator (e.g., secondary replicator/edge device 110*b*). This approach may allow for faster detection of a node failure and switchover to a backup replicator compared to using convergence of the overlay Protocol-Independent Multicast (PIM) network from all the other edge routers 110 (which is dependent on unicast routing updates).

In certain embodiments, a BFD session used to detect a node failure may be established from controller 104 to the active replicator (e.g., edge device 110*a*). The BFD session may detect liveliness for the entire active replicator node (e.g., in order to provide node-level redundancy as opposed to merely link-level redundancy). Thus, if controller 104 detects that the active replicator has gone down (e.g., based on the BFD session), controller 104 initiates switchover to one more backup replicators (e.g., edge device 110*b*). Another variation of the scheme is to establish BFD sessions between the active replicator (e.g., edge device 110*a*) and other edge devices 110 (e.g., at least the backup replicator(s)). An advantage of this variation is that a backup replicator (e.g., edge device 110*b*) can act faster because the backup replicator locally detects failure of the active replicator. A disadvantage is the increase in the number of BFD sessions required (e.g., O (n*n)), which may use resources that could otherwise be used for other purposes.

In certain embodiments, the standby replicator joins the source tree before switchover. In other embodiments, the standby replicator joins the source tree after switchover. Either way, the receivers 112 would get traffic from the standby replicator only after the synced entries are activated. An example of a sequence where the standby replicator joins the (S, G) tree after switchover is discussed below with respect to FIG. 4.

Certain embodiments provide live-live multicast streams using the dual replicators. This delivers two multicast streams with the same content over diverse paths in the network, reducing packet loss due to network failures on any one of the paths.

For purposes explanation, certain examples describe using one or more edge devices 110 as replicators. More generally, any node capable of replicating multicast traffic may be used as a replicator. Examples of such nodes may include a switch, a router, etc. For example, in certain embodiments, controller 104 selects a first node for replicating multicast traffic. The selection is based on software (rather than hardware/network topology). Controller 104 also selects a second node to provide redundancy for the first node. Controller 104 provides the second node with sync information so that the second node can provide redundancy without requiring the first node to maintain the sync. If the first node fails, replication of the multicast traffic is performed by the second node. In certain embodiments, the first node can be an active node, and the second node can be a standby node (e.g., cool, warm, or hot-standby node) or an active node (e.g., the second node can provide load balancing/load sharing during normal operation). In certain embodiments, switchover from the first node to the second node can be based on using a BFD session to detect a failure of the first node. In certain embodiments, receivers 112 for a particular multicast stream (*, G) or (s, g) send a join interest to the replicator (first node), which causes the replicator to join the applicable source tree. The redundant replicator (second node) joins the source tree either before or after switchover.

The example of FIG. 2 describes an SD-WAN 100 that performs multicast in a "software defined" manner using one or more replicators. In certain embodiments, SD-WAN 100 can be implemented with certain properties, for example:

The underlay of this network may use ingress replication such that every LHR gets a (unicast) copy of a packet;

Replication of packets happens (largely) at designated nodes replicators. With the introduction of the replicator, the multicast flow becomes more complex:

Joins/leaves from LHRs do not go to RPs or FHRs, instead they go through the replicator to reach the FHR or the RP;

The replicator behaves as an LHR from the perspective of an FHR or RP;

The replicator behaves as an FHR or RP from the perspective of an LHR;

The replicator stiches the data plane of the flow;

The replicator functionality can be co-existent in the same (physical) node behaving as an FHR, RP, LHR, or any combination of these; and Replicators can be daisy-chained or clustered to increase scale of LHRs;

Immediate switchover to Data multicast distribution tree (MDT) is used;

Route exchange between any two nodes happens through controller 104 (similar to a BGP route-reflector).

Figure 3:
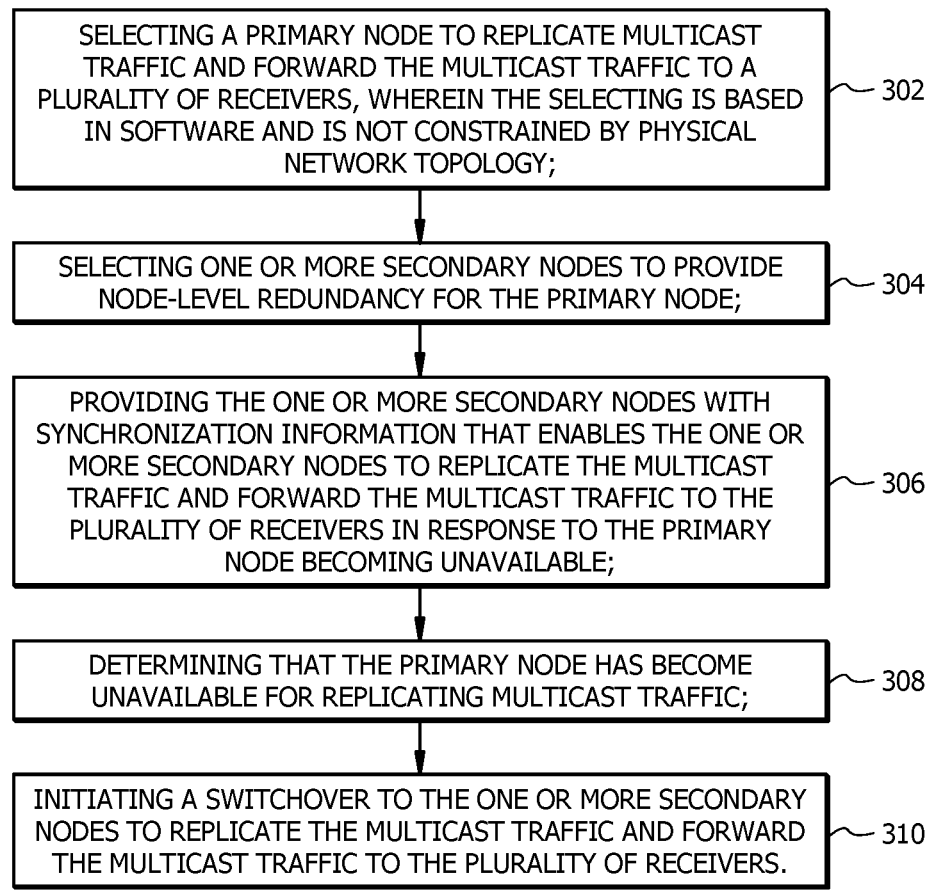
FIG. 3 illustrates an example of a method of node protection, in accordance with certain embodiments.

FIG. 3 illustrates an example of a method 300, in accordance with certain embodiments. In certain embodiments, method 300 may be performed by a controller in a control plane, such as controller 104 described above. For example, controller 104 may comprise a processor configured to execute instructions embodied on one or more computer-readable non-transitory storage media. The instructions may cause controller 104 to perform the steps of method 300.

Method 300 begins at step 302 with selecting a primary node to replicate multicast traffic and forward the multicast traffic to a plurality of receivers. The selecting is based in software. Because selecting the primary node is based in software, the selection is not constrained by physical network topology, for example, in the sense that selection of the primary node need not necessarily be based on a shortest path in terms physical network topology (e.g., based on, for example, link weights and other routing parameters, geographical distances, etc.) and/or need not necessarily be based on a point where joins from different receivers converge. The method proceeds to step 304 with selecting one or more secondary nodes to provide node-level redundancy for the primary node. The selecting of the secondary nodes may also be based on software without being constrained by physical network topology. The method proceeds to step 306 with providing the one or more secondary nodes with synchronization information that enables the one or more secondary nodes to replicate the multicast traffic and forward the multicast traffic to the plurality of receivers in response to the primary node becoming unavailable. In this manner, redundancy can be facilitated via controller 104 without requiring the primary node to directly maintain a sync with the secondary node(s).

In certain embodiments, a node may refer to an end device 110 or other node suitable for use as a replicator. A node may be considered "primary" in the sense that the particular node is selected to replicate multicast traffic. A node may be considered "secondary" in the sense that the particular node is selected to provide redundancy (e.g., backup) to the primary node so that, if the primary node becomes unavailable, multicast traffic that would have been replicated by the primary node may be replicated by the secondary node(s). Each secondary node may be configured to act as either a standby node (e.g., cool, warm, or hot-standby) or an active node when the primary node is active. In certain embodiments, method 300 comprises configuring at least one secondary node to be active and to perform load sharing with the primary node when the primary node is active. When load sharing, the primary node may replicate a first portion of multicast traffic and the one or more secondary nodes may replicate a second portion of multicast traffic. For example, the primary node may replicate multicast traffic for one location (e.g., East coast), and a secondary node may replicate multicast traffic for another location (e.g., West coast). As another example, the primary node may replicate multicast traffic for a first set of channels (e.g., channels 1-500), and a secondary node may replicate multicast traffic for another set of channels (e.g., channels 501-1000).

In certain embodiments, determining the synchronization information to provide to the one or more secondary nodes in step 306 is based at least in part on one or more joins associated with the primary node. The one or more joins may comprise messages that join the primary node to one or more multicast streams from which the primary node obtains the multicast traffic. Thus, the one or more secondary nodes may join the same multicast streams in order to replicate the multicast traffic if the primary node becomes unavailable. Certain embodiments provide the secondary node(s) with the synchronization information in a manner that enables secondary node(s) to join one or more multicast streams associated with the primary node after the primary node has become unavailable. Other embodiments provide secondary node(s) with the synchronization information in a manner that enables the secondary node(s) to join one or more multicast streams associated with the primary node before the primary node has become unavailable and to suppress the multicast traffic associated with the one or more multicast streams until after the primary node has become unavailable. The latter approach may facilitate a faster switchover because the joins would have already been completed by the secondary node(s) before failure of the primary node, however, the tradeoff is that it may be less efficient to require the secondary nodes(s) to obtain and suppress the multicast traffic during times when the primary node is available to replicate the multicast traffic and forward the multicast traffic to the receivers.

Certain embodiments determine that the primary node has become unavailable for replicating multicast traffic based on detecting a failure of the primary node, as shown in step 308. Certain embodiments detect the failure of the primary node based on information obtained from a BFD session. As discussed above, certain embodiments establish a BFD session between controller 104 and the primary node (e.g., the active replicator), and certain embodiments establish one or more BFD session between the primary node (e.g., the active replicator) and one or more secondary nodes (e.g., the backup replicator). Either type of BFD session can be used to detect the failure of the primary node. Based on detecting the failure of the primary node, method 300 initiates a switchover to the one or more secondary nodes, as shown in step 310. As an example, controller 104 may send a message to the secondary node(s) instructing the secondary node(s) to replicate multicast traffic for multicast streams that had been replicated by the primary node prior to the failure. In some embodiments, a secondary node may be configured with a same anycast IP address as the primary node to facilitate efficient switchover to the secondary node.

Figure 4:
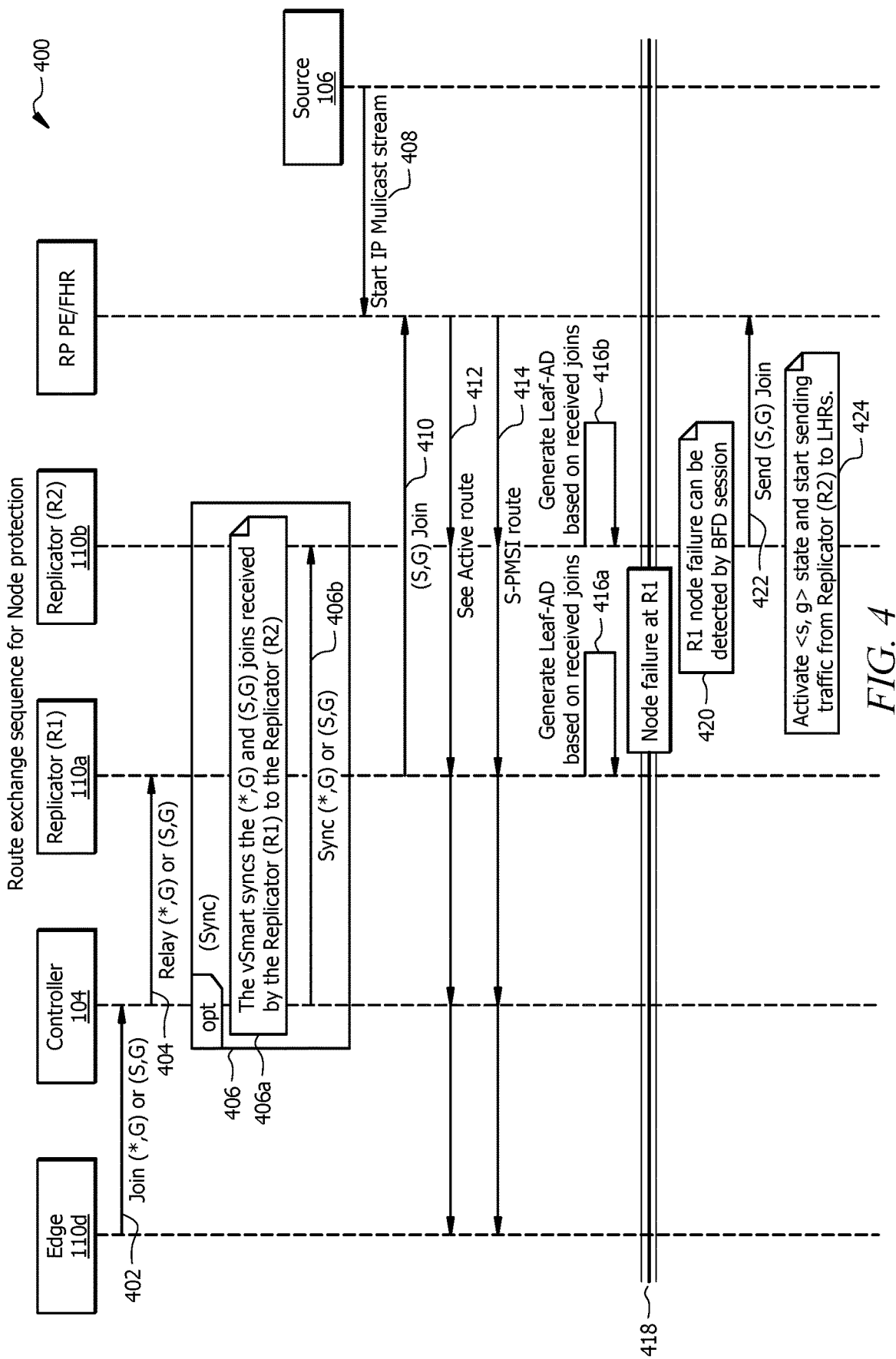
FIG. 4 illustrates an example of a route exchange sequence for node protection, in accordance with certain embodiments.

FIG. 4 illustrates an example of a route exchange sequence 400 for node protection. In the example of FIG. 4, messages may be communicated among edge device 110*d* (e.g., an edge device 110 associated with a receiver 112*d* receiving multicast data), controller 104, edge device 110*a* (e.g., an edge device defined as a primary replicator R1), edge device 110*b* (e.g., an edge device defined as a secondary replicator R2), an RP-PE/FHR, and source 106. Examples of edge devices 110 include Cisco's vEdge router or cEdge router. An example of controller 104 includes Cisco's vSmart. In certain embodiments, controller 104 defines primary replicator R1 as an active replicator and secondary replicator R2 as a standby replicator. Functionality of RP-PE/FHR may be performed by an RP 108, a provider edge (PE), or a first hop router (FHR), depending on the embodiment.

Route exchange sequence 400 begins at step 402 with edge device 110d sending a join message to controller 104. For example, the join message indicates that a receiver associated with edge device 110d requests to join a multicast stream. The join message may comprise a (*, G) join (in order to receive the multicast stream from any source) or an (S, G) join (in order to receive the multicast stream from a particular source).

In response to receiving the join message in step 402, controller 104 relays the join to primary replicator R1, as shown in step 404. Optionally, in certain embodiments, controller 104 synchronizes the secondary replicator R2, as shown in step 406. For example, controller determines the joins associated with the primary replicator R1 (step 406a) and sends the secondary replicator R2 a sync message that facilitates synchronizing those joins (step 406b). The joins may include one or more (*, G) joins and/or one or more (S, G) joins.

At step 408, source 106 sends a start message to the RP-PE/FHR. The start message indicates a start of a multicast stream (e.g., an IP multicast stream). At step 410, the primary replicator R1 sends a join message to the RP-PE/FHR. The join message indicates that the primary replicator R1 requests to join the multicast stream started in step 408. In certain embodiments, the join message of step 410 is an (S, G) join. After joining the multicast stream, the primary replicator R1 facilitates communicating the multicast stream to edge device 110d (as illustrated by source active route message 412 and Selective-Provider Multicast Service Interface (S-PMSI) message 414).

The primary replicator R1 may continue receiving joins and may generate Leaf-ADs based on the joins, as shown in step 416a. Similarly, the secondary replicator R2 may continue receiving joins and may generate Leaf-ADs based on the joins, as shown in step 416b.

In the event that the primary replicator R1 fails (as shown in step 418), the secondary replicator R2 may provide node-level redundancy. For example, at step 420, the secondary replicator R2 determines that the primary replicator R1 has failed. Certain embodiments use BFD sessions to detect that the primary replicator R1 has failed. In response to detecting that the primary replicator R1 has failed, the secondary replicator R2 proceeds to step 422 with sending the RP-PE/FHR one or more join messages requesting to join the multicast stream(s) for which the secondary replicator R2 was synchronized in step 406b. In certain embodiments, the join messages are (S, G) joins. At step 424, the (S, G) state is activated so that the secondary replicator R2 can start sending multicast streams to LHRs. In this manner, LHRs that had been receiving multicast streams via the primary replicator R1 prior to the failure may continue to receive the multicast streams via the secondary replicator R2 after the failure. Route exchange sequence 400 then ends.

Another option would be to send the join from secondary replicator R2 immediately, and suppress the replication in the data plane until the primary replicator R1 fails. For example, if secondary replicator R2 wants to implement 1+1 redundancy, the (S, G) join (RT-7) is sent immediately from the secondary replicator R2 to the RP-PE/FHR and the replication is suppressed. Thus, the duplicate data may be suppressed at the secondary replicator R2, or it could be even suppressed at an edge device, such as edge device 110d or 110e in FIG. 2, which may be a cEdge in certain embodiments. While this is less efficient, it improves the failure recovery.

Certain embodiments use reverse-path forwarding (RPF), for example, to ensure loop-free forwarding of multicast packets. In SD-WAN 100, an RPF-ID check can be based on the SD-WAN system IP of the incoming packet. For example, the Multicast Forwarding Information Base (MFIB) may program the expected SD-WAN system IP that is to be matched with the source IP of the incoming packet. For making the replicator node redundancy the following options can be considered for implementation:

The SD-WAN system IP used for a replicator that is protected can be made to have an anycast IP. In this case, the backup replicator should use the same anycast IP; or A mask-based RPF check can be performed at the egress PE (e.g., a /31 mask). This can weaken the security, but it can be considered, for example, if the Internet Protocol Security (IPSec) layer can provide the necessary authentication/non-repudiation.

Figure 5:
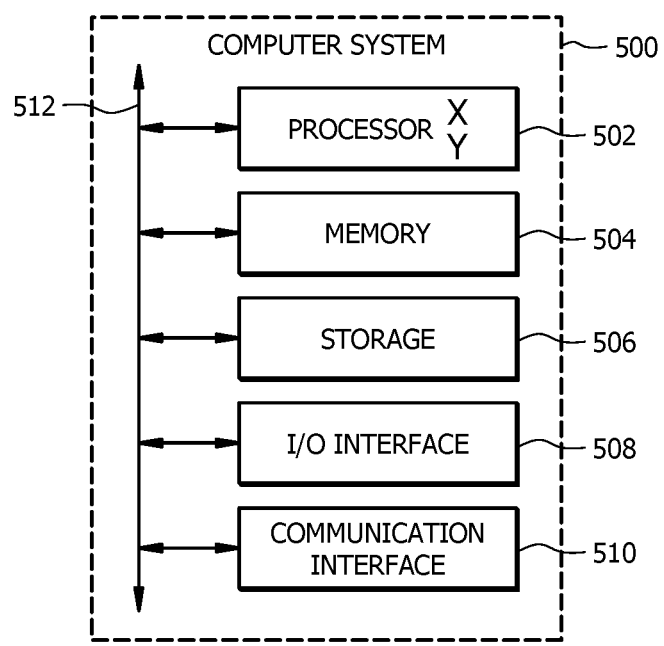
FIG. 5 illustrates an example of a computer system, in accordance with certain embodiments.

FIG. 5 illustrates an example computer system 500. In certain embodiments, any of network 102, controller 104, source 106, RP 108, edge device 110, and/or receiver 112, or components of any of the preceding, may be implemented using a computer system 500 or one or more components of computer system 500. In particular embodiments, one or more computer systems 500 perform one or more steps of one or more methods described or illustrated herein, such as one or more steps of the method described with respect to FIG. 3 or the route exchange sequence described with respect to FIG. 4. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example, and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes processing circuitry (e.g., processor 502), memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example, and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In certain embodiments, processor 502 may include one or more modules to facilitate the functionality described herein. As an example, processor 502 may comprise a module X configured to use software to select one or more replicators to replicate multicast traffic and/or a module Y configured to maintain synchronization between an active replicator and one or more other replicators selected to provide node-level redundancy for the active replicator.

In particular embodiments, memory 504 includes main memory for storing instructions for processor 502 to execute or data for processor 502 to operate on. As an example, and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example, and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example, and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example, and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Embodiments of the present disclosure may provide certain advantages. For example, certain embodiments provide node-level protection for a replicator that has been defined by software. As discussed above, in a traditional network that uses replication, the point of replication depends on the physical network topology. Because the point of replication depends on the physical network topology, the only way to change the replication point is to wire the network differently. Software-defined networks allow for selecting a point of replication strategically in software, without having to constrain the selection based on the hardware/physical network topology. Additionally, certain embodiments use a controller to facilitate redundancy of a replication node. Selection of the redundant node is flexible. For example, the controller can select any node and provide sync information so that a replicator node is not required to keep its redundant/backup node in sync. Node-level redundancy for the replicator node is important because when a replicator node goes out-of-service or is taken out-of-service, a large number of leaf nodes (receivers) would stop receiving traffic. This effect gets compounded when replicators are hierarchically designed. Node-level redundancy may provide advantages compared to techniques that use stream-level redundancy. For example, node-level redundancy can be used to ensure that all receivers that receive multicast data from a replicator continue to receive the multicast data from another replicator in the event that the original replicator fails. Additionally, node-level redundancy may allow for more efficient use of resources compared to stream-level redundancy techniques, such as techniques that require sending redundant multicast streams via maximally redundant trees.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them.

Particular embodiments may include all, some, or none of the components, elements, features, functions, operations, or steps of the embodiments disclosed herein. Embodiments according to the disclosure are in particular directed to a method, a storage medium, a system and a computer program product, wherein any feature mentioned in one category, e.g. method, can be applicable in another category, e.g. system, as well. The various features disclosed herein may be combined or separated in any suitable manner.

The invention claimed is:

1. A system, the system comprising:
one or more processors; and
one or more computer-readable non-transitory storage media, the one or more computer-readable non-transitory storage media comprising instructions that, when executed by the one or more processors, cause one or more components of the system to perform operations comprising:
selecting a primary node to replicate multicast traffic and forward the multicast traffic to a plurality of receivers, the selecting based in software;
selecting a plurality of secondary nodes to provide node-level redundancy for the primary node; and
providing the plurality of secondary nodes with synchronization information that enables the plurality of secondary nodes to replicate the multicast traffic, suppress the replicated multicast traffic at the plurality of secondary nodes, and forward the replicated multicast traffic to the plurality of receivers in response to the primary node becoming unavailable.

2. The system of claim 1, wherein providing the plurality of secondary nodes with the synchronization information comprises:
determining, by a controller that participates in a control plane, one or more joins associated with the primary node, wherein the one or more joins join the primary node to one or more multicast streams from which the primary node obtains the multicast traffic; and
determining, by the controller, the synchronization information to provide to the one or more secondary nodes, the synchronization information based at least in part on the one or more joins associated with the primary node;
wherein providing the plurality of secondary nodes with the synchronization information is performed by the controller.

3. The system of claim 1, wherein at least one of the plurality of secondary nodes is configured to act as a standby node when the primary node is active.

4. The system of claim 1, wherein at least one of the plurality of secondary nodes is configured as an active node that performs load sharing with the primary node when the primary node is active.

5. The system of claim 1, wherein the operations further comprise:
detecting a failure of the primary node based on information obtained from a Bidirectional Forwarding Detection (BFD) session; and
initiating a switchover to the plurality of secondary nodes based on detecting the failure of the primary node.

6. The system of claim 1, wherein providing the plurality of secondary nodes with the synchronization information enables the plurality of secondary nodes to join one or more multicast streams associated with the primary node after the primary node has become unavailable.

7. The system of claim 1, wherein providing the plurality of secondary nodes with the synchronization information enables the plurality of secondary nodes to join one or more multicast streams associated with the primary node before the primary node has become unavailable and to suppress the multicast traffic associated with the one or more multicast streams until after the primary node has become unavailable.

8. The system of claim 1, further comprising configuring one of the plurality of secondary nodes with a same anycast Internet Protocol (IP) address as the primary node.

9. A method for use in a controller that participates in a control plane, the method comprising:
selecting a primary node to replicate multicast traffic and forward the multicast traffic to a plurality of receivers, the selecting based in software;
selecting a plurality of secondary nodes to provide node-level redundancy for the primary node; and
providing the plurality of secondary nodes with synchronization information that enables the plurality of secondary nodes to replicate the multicast traffic, suppress the replicated multicast traffic at the secondary nodes, and forward the replicated multicast traffic to the plurality of receivers in response to the primary node becoming unavailable.

10. The method of claim 9, wherein providing the plurality of secondary nodes with the synchronization information comprises:
determining one or more joins associated with the primary node, wherein the one or more joins join the primary node to one or more multicast streams from which the primary node obtains the multicast traffic; and
determining the synchronization information to provide to the plurality of secondary nodes, the synchronization information based at least in part on the one or more joins associated with the primary node.

11. The method of claim 9, further comprising:
detecting a failure of the primary node based on information obtained from a Bidirectional Forwarding Detection (BFD) session; and
initiating a switchover to the plurality of secondary nodes based on detecting the failure of the primary node.

12. The method of claim 9, wherein the method provides the synchronization information in a manner that enables the secondary nodes to join one or more multicast streams associated with the primary node after the primary node has become unavailable.

13. The method of claim 9, wherein the method provides the synchronization information in a manner that enables the secondary nodes to join one or more multicast streams associated with the primary node before the primary node has become unavailable and to suppress the multicast traffic associated with the one or more multicast streams until after the primary node has become unavailable.

14. One or more computer-readable non-transitory storage media embodying instructions that, when executed by a processor of a controller that participates in a control plane, cause the performance of operations including:
selecting a primary node to replicate multicast traffic and forward the multicast traffic to a plurality of receivers, the selecting based in software;
selecting plurality of secondary nodes to provide node-level redundancy for the primary node; and
providing the plurality of secondary nodes with synchronization information that enables the plurality of secondary nodes to replicate the multicast traffic, suppress the replication of multicast traffic at the secondary nodes, and forward the replicated multicast traffic to the plurality of receivers in response to the primary node becoming unavailable.

15. The one or more computer-readable non-transitory storage media of claim 14, wherein providing the plurality of secondary nodes with the synchronization information comprises:
   determining one or more joins associated with the primary node, wherein the one or more joins join the primary node to one or more multicast streams from which the primary node obtains the multicast traffic; and
   determining the synchronization information to provide to the plurality of secondary nodes, the synchronization information based at least in part on the one or more joins associated with the primary node.

16. The one or more computer-readable non-transitory storage media of claim 14, wherein the operations comprise configuring at least one of the plurality of secondary nodes to act as a standby node when the primary node is active.

17. The one or more computer-readable non-transitory storage media of claim 14, wherein the operations comprise configuring at least one of the plurality of secondary nodes as an active node that performs load sharing with the primary node when the primary node is active.

18. The one or more computer-readable non-transitory storage media of claim 14, wherein the operations further comprise:
   detecting a failure of the primary node based on information obtained from a Bidirectional Forwarding Detection (BFD) session; and
   initiating a switchover to the plurality of secondary nodes based on detecting the failure of the primary node.

19. The one or more computer-readable non-transitory storage media of claim 14, wherein the operations provide the synchronization information in a manner that enables the secondary nodes to join one or more multicast streams associated with the primary node after the primary node has become unavailable.

20. The one or more computer-readable non-transitory storage media of claim 14, wherein the operations provide the synchronization information in a manner that enables the secondary nodes to join one or more multicast streams associated with the primary node before the primary node has become unavailable and to suppress the multicast traffic associated with the one or more multicast streams until after the primary node has become unavailable.

* * * * *